Figure 1:
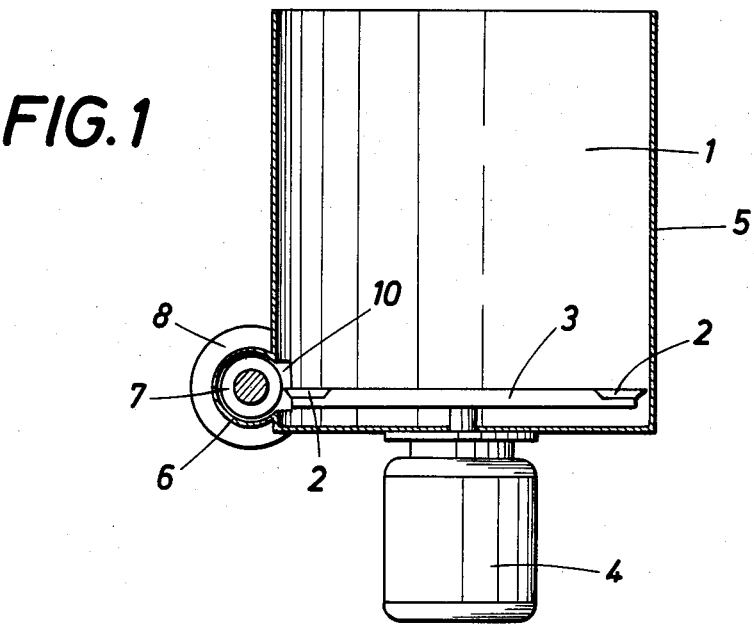

United States Patent [19]

Bacher et al.

[11] 4,222,728
[45] Sep. 16, 1980

[54] APPARATUS FOR PROCESSING SYNTHETIC THERMOPLASTIC MATERIAL

[75] Inventors: Helmut Bacher, Linz; Helmuth Schulz, St. Florian, both of Austria

[73] Assignee: Krauss-Maffei Austria Gesellschaft m.b.H., Asten, Austria

[21] Appl. No.: 14,083

[22] Filed: Feb. 22, 1979

[30] Foreign Application Priority Data

Mar. 2, 1978 [AT] Austria .................. 1475/78

[51] Int. Cl.² ............ B29B 1/00; B29F 3/00
[52] U.S. Cl. .................. 425/305.1; 241/101.2; 241/282.1; 264/37; 264/138; 264/176 R; 366/77; 366/196; 425/376 B; 425/378 R
[58] Field of Search ............ 264/37, 176 R, 138; 425/202, 204, 296, 378 R, 380, 324.1, 376 R, 461, 302.1, 305.1, 376 B, 378 R, 202; 241/101.2, 277, 282.1, 282.2; 366/77, 194, 195, 196

[56] References Cited

U.S. PATENT DOCUMENTS

| 148,527 | 3/1874 | Tisdale | 425/202 |
| 855,379 | 5/1907 | Bangs | 425/202 |
| 1,814,496 | 7/1931 | Swärd et al. | 425/202 |
| 3,008,184 | 11/1961 | Fritsch | 425/204 |
| 3,773,586 | 11/1973 | Koch | 156/193 |
| 4,063,860 | 12/1977 | Cushing | 425/202 |

FOREIGN PATENT DOCUMENTS

| 2156198 | 6/1974 | Fed. Rep. of Germany . |
| 351716 | 6/1969 | U.S.S.R. | 425/202 |

Primary Examiner—W. E. Hoag
Attorney, Agent, or Firm—Kurt Kelman

[57] ABSTRACT

Apparatus for processing synthetic thermoplastic material, such as sheeting, hollow bodies, and splinters, comprises an upright receiving container, which is adapted to be charged from above, and at least one disintegrating and blending member, which is set with knives and is mounted on the container near its bottom and rotates about the axis of the container. The receiving container has in its side wall an opening which is disposed on the level of the disintegrating and blending member and leads to a screw extruder, which is tangential to the receiving container and directly connected thereto.

2 Claims, 2 Drawing Figures

U.S. Patent  Sep. 16, 1980  4,222,728

APPARATUS FOR PROCESSING SYNTHETIC THERMOPLASTIC MATERIAL

This invention relates to apparatus for processing synthetic thermoplastic material, such as sheeting, hollow bodies and splinters, comprising an upright receiving container, which is adapted to be charged from above, and at least one disintegrating and blending member, which is set with knives and is mounted in the container near its bottom and rotates about the axis of the container.

In an apparatus of that kind which is known from German Pat. No. 2,156,198, the plastic parts, to be processed, which are usually soiled, are thrown into the receiving container from above while the disintegrating members are rotating, and washing liquid is supplied from above at the same time. The duration of the washing operation depends on the degree to which the plastic is soiled. When the washing operation has been terminated, all liquid is permitted to drain through a short drainpipe, which is arranged near the bottom of the container and preceded by a screen to prevent an escape of previously disintegrated plastic material. The operation of the disintegrating members is then continued until the plastic particles are compacted and agglomerate. During that phase, cooling liquid may be supplied through injection nozzles for a short time. When the agglomerate has consolidated and has been cooled down and no longer tends to cake, it is discharged through a short discharge pipe, which is also arranged near the bottom. The material is then available for being processed later in extruders. In the receiving container, the plastic material is not only washed but the heat generated during the disintegration is utilized for the agglomeration of the material. A disadvantage resides in the intermittent operation, which involves a considerable labor expenditure for the operation of the apparatus and renders an automation of the operations rather difficult. Besides, the resulting agglomerates or granules differ in particle size and it is not possible to filter molten material.

It is also known to disintegrate plastic material in a mill and to feed the disintegrated material to a bin and to supply the disintegrated material from the bin by a pressure feeding mechanism into an extruder, which is in most cases a screw extruder. This involves a high structural expenditure and a low thermal efficiency because the heat generated in the disintegrating mill is not utilized. Besides, a mill cannot produce an adequate blending action or cannot produce a blending action at all.

U.S. Pat. No. 3,773,586 discloses an apparatus in which blending blades rotate in a funnel-shaped container. The shaft carrying the blending blades merges at its lower end into a conveyor screw, which stuffs the blend into a screw extruder, into which the funnel-shaped container opens. The container is preceded by a separate disintegrator. In the latter, a rejected product in the form of a continuous web of sheeting is severed by means of rolls and knife tools to form laminated pieces, which then fall into the container and finally enter the extruder. When a rejected product is not available, the container may be charged with conventional granules. That apparatus is also relatively expensive because a separate disintegrator for the web of sheeting is required and the blending blades are succeeded by a separate pressure feeding screw. The thermal efficiency is also unsatisfactory because the heat generated by the disintegration of the web is used only to hold the laminated pieces together but is hardly transmitted as far as to the extruder. The apparatus has a relatively large overall height because the pressure feeding screw is succeeded by the stuffing screw and the latter by the extruder.

For this reason it is an object of the invention to eliminate these disadvantages and to provide an apparatus which is of the kind described first hereinbefore and which has a relatively simple structure and can easily be operated with a high thermal efficiency and is suitable for processing plastic material of various kinds and ensures that the end product has a uniform particle size.

This object is accomplished according to the invention in that the receiving container has in its side wall an opening which is disposed on the level of the disintegrating and blending member and leads to a screw extruder, which is tangential to the receiving container and directly connected thereto.

The plastic material to be processed may be continuously charged into the receiving container so that there is no need for preceding disintegrating members and the material is engaged, disintegrated and thoroughly blended by the disintegrating and blending members which are disposed in the container and set with knives. This results in a heating of the material. As the particles of the material are rotated by the disintegrating and blending members, the centrifugal force causes the particles to exit through the opening in the side wall of the container and to be forced into and fill the conveyor screw of the extruder so that a separate pressure feeding screw is not required. As a result, the structural expenditure is decreased and the overall height of the apparatus is favorably decreased too. The tangential arrangement of the screw extruder results in a particularly desirable structure. The softened plastic material, which has been preheated in the vessel, is plasticized by the conveyor screw of the extruder and by said screw is conveyed to any desired die at the outlet end of the extruder. That die may consist of a granulating die, which ensures a uniform particle size of the final product. It will be understood that a different die can be used to obtain a different product. The die can readily be preceded by a breaker plate for filtering the molten material.

This relatively simple apparatus operates continuously and with a high thermal efficiency and produces a strong blending action because the plastic material charged into the receiving container is forced by the rotating disintegrating and blending members not only to rotate about the axis of the container but also to circulate in radial planes. The apparatus can easily be controlled. This human control may be restricted to the charging of the material to the receiving container and the supervision of the operations, which can readily be automated. Different kinds of used plastic material can be processed.

If the material is not heated to a sufficiently high temperature by the disintegrating and blending members and by the motion of the screw, the screw extruder may be provided in known manner with a heater.

Figure 2:
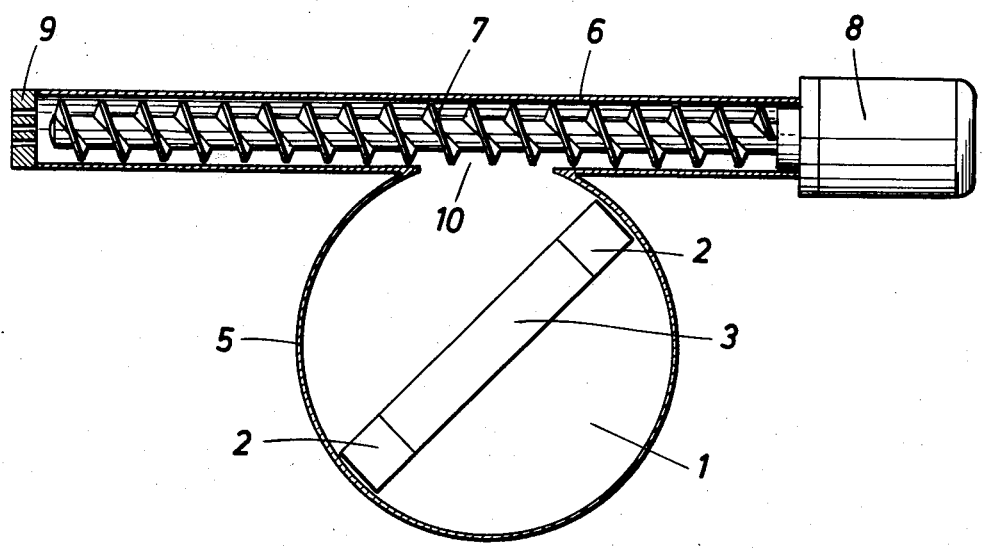

The subject matter of the invention is strictly diagrammatically shown on the accompanying drawing, in which FIG. 1 is a vertical sectional view showing apparatus for processing synthetic thermoplastic material and FIG. 2 is a horizontal sectional view taken on a plane through the axis of the extruder of the apparatus of FIG. 1.

An upright receiving container 1, which is adapted to be charged from above, contains a cutter bar 3, which is disposed near the bottom of the container 1 and set with knives 2 and is rotated at high speed about the axis of the container by a motor 4. The knives 2 may cooperate with stationary knives mounted on the side wall 5 of the container. A screw extruder is provided, which is tangential to the receiving container and comprises a housing 6, a conveyor screw 7, a drive motor 8 and a granulating die 9. Material can be fed to that screw extruder 6, 7 through an opening 10, which is formed in the side wall 5 of the receiving container 1 on the level of the cutter bar 3. The centrifugal force of the material which revolves in the receiving container 1 is utilized to force the material into the extruder 6, 7.

What is claimed is:

1. An apparatus for processing synthetic thermoplastic material, comprising
   (a) an upright receiving container having a vertical axis, a side wall surrounding the axis, a bottom wall and an upper end opposite the bottom wall, the upper end being adapted to receive the synthetic thermoplastic material to be charged into the container, and
      (1) the side wall of the container defining an opening near the bottom of the container,
   (b) a disintegrating and blending means for the synthetic thermoplastic material mounted in the container to revolve about the axis substantially on the level of the opening, the revolving disintegrating and blending means
      (1) including knife means and
      (2) imparting to the material a centrifugal force causing the material to move radially outwardly through the opening, and
   (c) a screw extruder including a housing and a screw conveyor mounted in the housing, the screw extruder extending tangentially to the side wall of the container and the housing of the screw extruder being connected to the side wall, the opening in the side wall being in communication with the interior of the housing whereby the outwardly moving synthetic thermoplastic material is fed to the screw conveyor by the centrifugal force through the opening in the side wall.

2. The apparatus of claim 1, further comprising a heater for the screw extruder.

* * * * *